Dec. 27, 1966   R. V. HARRINGTON   3,294,556
TAN OPHTHALMIC GLASS
Filed July 19, 1963
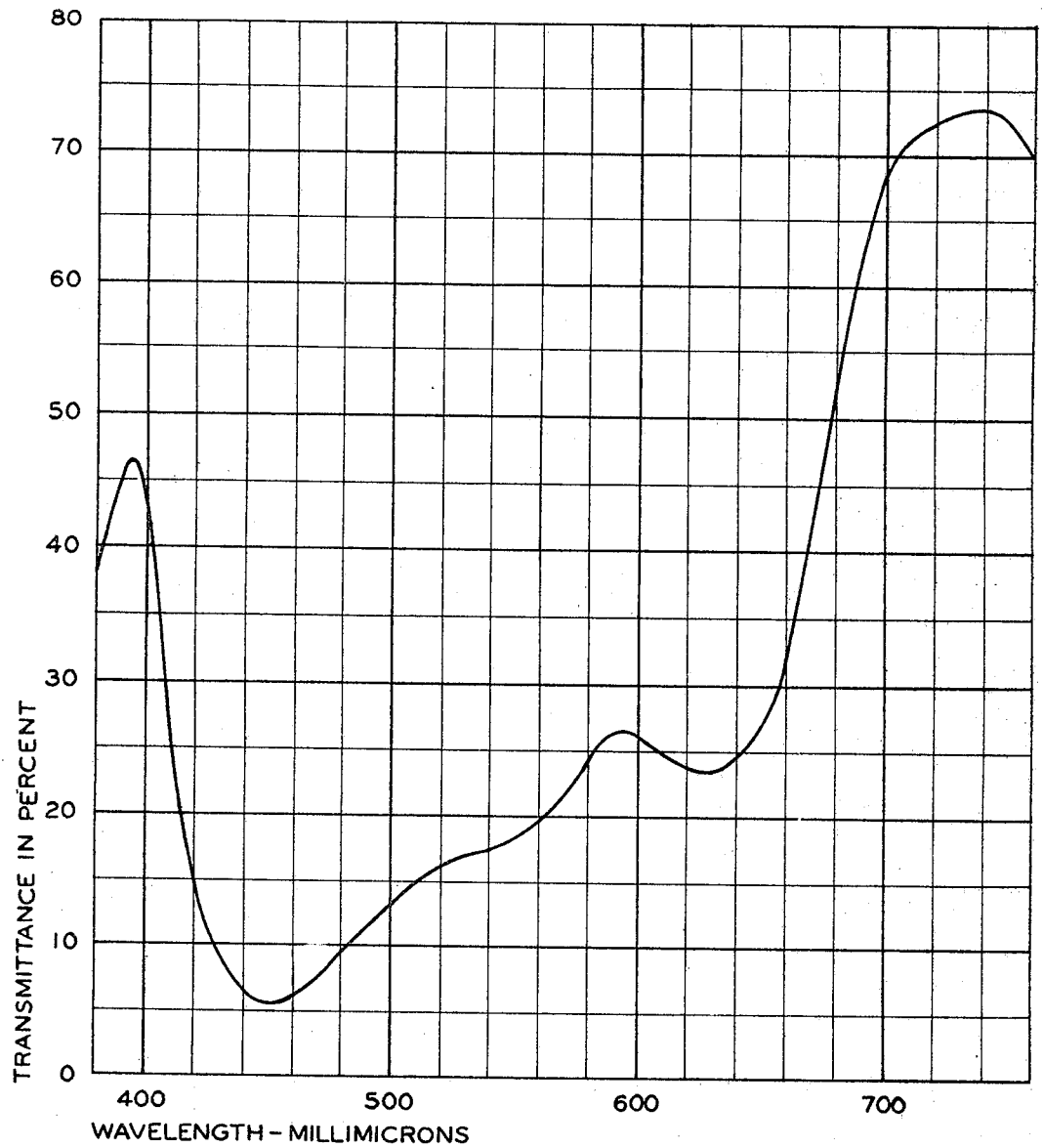
INVENTOR.
Roy V. Harrington
BY
ATTORNEY

United States Patent Office 3,294,556
Patented Dec. 27, 1966

---

3,294,556
TAN OPHTHALMIC GLASS
Roy V. Harrington, Corning, N.Y., assignor to Corning Glass Works, Corning, N.Y., a corporation of New York
Filed July 19, 1963, Ser. No. 297,485
6 Claims. (Cl. 106—52)

This invention relates to tinted ophthalmic glasses and in particular to a tan ophthalmic glass suitable for the manufacture of filters, lenses and similar light transmitting media.

The primary object of this invention is to provide ophthalmic glasses having a pleasing tan color, suitable for use in light filters, eye-shades and the like, and particularly well-adapted for use in prescription lenses for eyeglasses where eye-relief from bright sunlight is desired.

A further object is to provide readily-reproducible, easily meltable tan ophthalmic glasses.

A still further object is to achieve a desirable tan color in a glass having an index of refraction of between 1.52 and 1.53.

These and other objects may be attained by means of the present invention which resides in an ophthalmic glass containing a combination of coloring oxides comprising, in weight percent as calculated from the batch, 0.2 to 0.6% NiO, 0.5 to 2.0% $CeO_2$ and 0.5 to 2.0% $Fe_2O_3$.

FIGURE 1 represents the transmission curve of a preferred glass of the present invention consisting essentially of, in weight percent, as calculated from the batch, 65.7% $SiO_2$, 0.3% $TiO_2$, 2.0% $Al_2O_3$, 9.0% CaO, 3.4% ZnO, 9.2% $K_2O$, 7.9% $Na_2O$ and a combination of coloring oxides consisting of 0.4% NiO, 1.0% $CeO_2$ and 1.0% $Fe_2O_3$.

Table I, below, sets forth further examples of the glasses of the present invention and the ranges within which the constituent oxides may vary, the compositions being shown in weight percent, as calculated from the batch.

*Table I*

| Ingredient | Compositions (Percent by Weight as calculated from the batch) | | | |
|---|---|---|---|---|
| | A | B | C | Range |
| $SiO_2$ | 68.2 | 65.7 | 68.4 | 60–73 |
| $TiO_2$ | 0.3 | 0.3 | 0.3 | 0–5 |
| $Al_2O_3$ | 2.0 | 2.0 | 2.1 | 0–5 |
| CaO | 7.0 | 9.0 | 6.3 | 5–10 |
| ZnO | 2.4 | 3.4 | 2.5 | 0–5 |
| $K_2O$ | 9.2 | 9.2 | 8.6 | 5–12 |
| $Na_2O$ | 7.9 | 7.9 | 5.1 | 5–12 |
| $B_2O_3$ | | | 4.2 | 0–5 |
| CoO | | 0.0005 | | 0–.001 |
| NiO | 0.4 | 0.4 | 0.4 | 0.2–0.6 |
| $CeO_2$ | 1.0 | 1.0 | 1.0 | 0.5–2 |
| $Fe_2O_3$ | 1.0 | 1.0 | 1.0 | 0.5–2 |

The glasses of the present invention may be produced from conventional batch ingredients such as those set forth in Table II below, wherein the batch compositions A, B and C correspond to the oxide compositions A, B and C set forth in Table I, above. Composition D corresponds to the glass giving the transmission curve of FIGURE 1.

*Table II*

| Batch Ingredient | Batch Compositions (Parts by Weight) | | | |
|---|---|---|---|---|
| | A | B | C | D |
| Sand | 273.0 | 259.0 | 261.0 | 259.0 |
| Calcite | 50.2 | 64.5 | 43.0 | 64.5 |
| Titania | 1.2 | 1.2 | 1.2 | 1.2 |
| Calcined Alumina | 8.0 | 8.0 | 8.0 | 8.0 |
| Zinc Oxide | 9.6 | 13.6 | 9.6 | 13.6 |
| Potash | 54.0 | 54.0 | 48.1 | 54.0 |
| Sodium Carbonate | 40.7 | 40.7 | 19.9 | 40.7 |
| Antimony Trioxide | 1.6 | 1.6 | 1.6 | 1.6 |
| Sodium Nitrate | 22.0 | 22.0 | 22.0 | 22.0 |
| Boric Acid | | | 28.5 | |
| Nickel Oxide | 1.6 | 1.6 | 1.6 | 1.6 |
| Calcined Cerium Oxalate | 4.0 | 4.0 | 4.0 | 4.0 |
| Iron Oxide | 4.0 | 4.0 | 4.0 | 4.0 |
| Cobaltous Oxide | | 2.0 | | |

The glasses of the present invention as exemplified by the batch compositions set forth above may be melted in a conventional optical glass melting tank at a temperature of about 1400° C. to 1600° C. under non-reducing conditions to maintain the iron oxide substantially in the ferric state.

Antimony trioxide was employed as a fining agent in the above examples. However, other conventional fining agents, e.g. $As_2O_3$ may be employed. Since antimony trioxide is quite volatile at the melting temperature of the batches and is not present in significant amounts in the final glass, it is not shown in the final oxide compositions of Table I.

The glasses of the present invention are further characterized by an index of refraction in the range of 1.52 to 1.53, in accordance with industry accepted standards for glasses suitable for use in eye-corrective lenses.

The amounts of the various ingredients should be maintained within the ranges shown in Table I, above, in order to provide the glass with the desired tan coloration, an index of refraction of 1.52 to 1.53, good melting properties and suitable chemical durability.

The amounts of the coloring oxides, NiO, $CeO_2$ and $Fe_2O_3$ may vary within the ranges shown in Table I. Within the stated ranges, I have found particularly desirable color characteristics are achieved in a glass wherein coloring oxides are present in a weight ratio of $NiO:CeO_2:Fe_2O_3$ of about 4:10:10. As the total amount of coloring oxides is increased, the optical density of the glass is increased. The optical density desired in a particular glass may be dependent on the thickness of the glass article to be produced. Glasses containing about 0.4% NiO, 1.0% $CeO_2$ and 1.0% $Fe_2O_3$ are suitable for the production of lenses for eyeglasses.

$SiO_2$ is the principal network forming oxide. The presence of greater than 73% $SiO_2$ results in a glass which is difficult to melt. If less than 60% $SiO_2$ is used, the chemical durability is adversely affected.

The alkali-metal oxides are employed as fluxes to lower the melting temperature of the glass. Small amounts of $B_2O_3$ also may be employed for this purpose. If an excess of the alkali-metal oxide or $B_2O_3$ is employed, the chemical durability of the glass is lowered objectionably.

TiO$_2$ is employed to increase the refractive index of the glass. However, an excess of TiO$_2$ increases the tendency of the glass to devitrify.

Al$_2$O$_3$ is employed as an aid in preventing devitrification of the glass. However, an excess of Al$_2$O$_3$ causes an objectionable increase in the melting temperature of the glass and decreases the chemical durability.

ZnO and CaO are effective in increasing the refractive index; however, an excess of the oxides may result in an increase in the tendency of the glass to devitrify. In addition, if the amount of CaO is less than about 6% by weight, the color of the glass becomes noticeably purple. This undesirable shift in color may be corrected by the addition of up to 5% by weight of B$_2$O$_3$.

Cobalt oxide may be added in amounts up to about .001% by weight to lower the ultraviolet transmitting properties of the glass. If added in excess of this amount, the desirable tan color of the glass is adversely affected.

It will be apparent to those skilled in the art that many variations and modifications of the invention as hereinabove set forth may be made without departing from the spirit and scope of the invention. The invention is not to be limited to those details shown above except as set forth in the appended claims.

What is claimed is:

1. A tan ophthalmic glass consisting essentially of the following calculated oxide composition, in percent by weight, 60 to 73% SiO$_2$, 0 to 5% TiO$_2$, 0 to 5% Al$_2$O$_3$, 5 to 10% CaO, 0 to 5% ZnO, 5 to 12% K$_2$O, 5 to 12% Na$_2$O, 0 to 5% B$_2$O$_3$, 0 to .001% CoO, 0.2 to 0.6% NiO, 0.5 to 2.0% CeO$_2$ and 0.5 to 2.0% Fe$_2$O$_3$, the refractive index being between 1.52 and 1.53.

2. A tan ophthalmic glass according to claim 1 wherein the NiO content is about 0.4%, the CeO$_2$ content is about 1.0% and the Fe$_2$O$_3$ content is about 1.0%.

3. A tan ophthalmic glass according to claim 2 wherein CoO is present in an amount of about .0005% by weight.

4. A tan ophthalmic glass consisting essentially of the following calculated oxide composition, in percent by weight,

| | Percent |
|---|---|
| SiO$_2$ | 65.7 |
| TiO$_2$ | 0.3 |
| Al$_2$O$_3$ | 2.0 |
| CaO | 9.0 |
| ZnO | 3.4 |
| K$_2$O | 9.2 |
| Na$_2$O | 7.9 |
| NiO | 0.4 |
| CeO$_2$ | 1.0 |
| Fe$_2$O$_3$ | 1.0 |

5. In an ophthalmic glass consisting essentially of, in percent by weight, 60 to 73% SiO$_2$, 0 to 5% TiO$_2$, 0 to 5% Al$_2$O$_3$, 5 to 10% CaO, 0 to 5% ZnO, 5 to 12% K$_2$O, 5 to 12% Na$_2$O, 0 to 5% B$_2$O$_3$ and 0 to .001% CoO, the improvement which comprises incorporating in the glass a combination of coloring oxides consisting of 0.2 to 0.6% NiO, 0.5 to 2.0% CeO$_2$ and 0.5 to 2.0% Fe$_2$O$_3$.

6. The process according to claim 5 wherein the weight ratio of NiO:CeO$_2$:Fe$_2$O$_3$ is about 4:10:10.

References Cited by the Examiner

UNITED STATES PATENTS

| 2,752,506 | 6/1956 | Fitzgerald et al. | 250—83 |
| 2,901,366 | 8/1959 | Smith et al. | 106—52 |
| 2,902,377 | 9/1959 | Duncan | 106—52 |
| 3,126,295 | 3/1964 | Young | 106—47 |

TOBIAS E. LEVOW, *Primary Examiner.*

H. McCARTHY, *Assistant Examiner.*